April 4, 1967 W. KASTEN 3,312,351
FUEL FILTER WATER SEPARATOR
Filed July 1, 1964
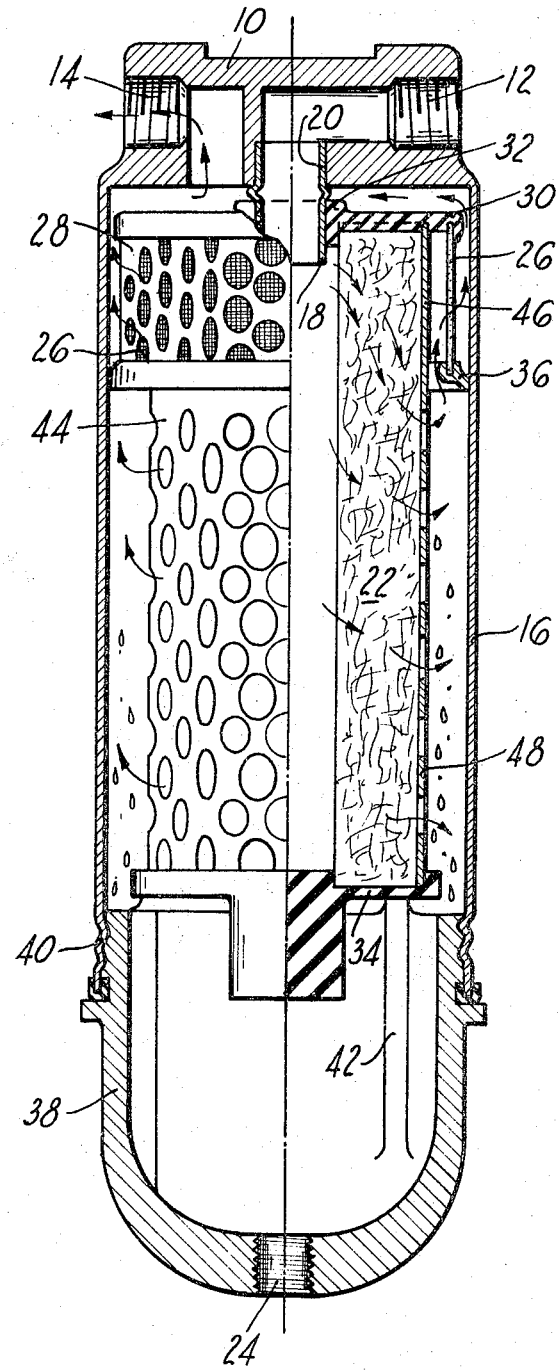
INVENTOR.
WALTER KASTEN
BY
William N. Antonis
ATTORNEY

United States Patent Office 3,312,351
Patented Apr. 4, 1967

3,312,351
FUEL FILTER WATER SEPARATOR
Walter Kasten, Madison Heights, Mich., assignor to The Bendix Corporation, Madison Heights, Mich., a corporation of Delaware
Filed July 1, 1964, Ser. No. 379,652
2 Claims. (Cl. 210—307)

This invention relates to fuel filter water separators in general and more particularly to a unique compact fuel filter water separator assembly.

Heretofore, in order to obtain efficient operation, filter water separators normally contained two separate unconnected elements usually called the coalescer element and the separator element. Such arrangements usually required a multiplicity of seals, mounting studs, or other fasteners, all of which tended to complicate the servicing or replacement of the filter water separator components.

Accordingly, it is an object of this invention to provide a fuel filter water separator assembly which utilizes a minimum number of seals and permits easy servicing and replacement of the filter water separator components.

Another object of this invention is to provide a compact fuel filter water separator assembly which utilizes an inexpensive simple disposable unitized combination coalescer and separator element.

A further object of this invention is to provide an inexpensive small fuel filter water separator assembly which may be used in connection with boats or small truck engines.

The above and other objects and features of this invention will become apparent from the following description taken in connection with the accompanying drawing which forms a part of this specification.

Referring to the single figure of the drawing, which shows a sectional view of the fuel filter water separator assembly, it will be seen that the numeral 10 indicates a filter head having an inlet port 12, an outlet port 14, and a cylindrical housing 16 extending therefrom. A tubular member 18 is connected to and extends from the head 10, said tubular member having the inner wall 20 thereof communicating with the inlet port 12.

A substantially cylindrical fiber glass coalescer element 22 of the inside-out flow type is located within the housing 16 and is interposed between the inlet and outlet ports 12 and 14 for coalescing water contained in the fuel into relatively large droplets, most of which gravitate to the water sump 24. The fiberglass cylinder is also capable of retaining most of the solid contaminants which the fuel may contain.

Located downstream of the coalescer element 22 is a substantially cylindrical Teflon coated wire mesh separator element 26 of the inside-out flow type which is telescoped over and spaced away from the coalescer element. The separator element, which is only approximately one-third the length of the coalescer element, permits flow of fuel therethrough but prevents flow of any water droplets therethrough. The Teflon coated screen, which has an affinity for fuel but not water, in effect "strips" the fuel of any water droplets which might have been carried upwards in the fuel. In order to increase the rigidity of Teflon coated screen, it is backed up by a perforated metal cylinder 28.

An upper endcap 30, which is common to both the coalescer element 22 and the separator element 26, unifies the two elements and provides a seal 32 on the inner periphery thereof for sealing engagement with the outer wall of the tubular member 18. A lower endcap 34 closes the lower end of the coalescer element. Although, the coalescer and separator element are shown embedded in plastic endcaps, metal endcaps may be utilized in place thereof and suitably connected to the elements, if it is so desired. To the lower end of the separator element 26 is attached a grommet type flexible seal 36 which engages the inner wall of the housing 16 and prevents passage of fluid from the coalescer element to the outlet port without going through the separator element.

A plastic transparent water sump bowl 38, which is attached to the metal cylindrical housing by a mason jar type thread 40, contains internal ribs 42 which abut the lower endcap 34 of the coalescer element and maintain the seal 32 in engagement with the outer wall of the tubular member 18. In order to provide a quiescent zone between the coalescer element and the separator element, that is, prevent direct flow through the upper portion of the coalescer element across to said separator element, a baffle 44 is wrapped around said coalescer element, said baffle being imperforate at least along that portion 46 thereof which is surrounded by the separator element and perforate along the remaining portion 48 thereof. In order to insure the existence of a quiescent zone, it has been found desirable to extend the imperforate portion of the baffle approximately ¼" below the separator element.

The several practical advantages which flow from this invention particularly with respect to the unique arrangement of the component parts of the assembly are believed to be obvious from the above, and other advantages may suggest themselves to those who are familiar with the art to which this invention relates.

Having thus described the various features of the invention, what I claim as new and desire to secure by Letters Patent is:

1. A fuel filter water separator assembly comprising a head having inlet and outlet ports therein and a substantially cylindrical housing extending therefrom, a tubular member operatively connected to and extending from said head, said tubular member having the inner wall thereof communicating with said inlet port, a substantially cylindrical coalescer element of the inside-out flow type located in said housing and interposed between said inlet and outlet ports for coalescing water contained in the fuel passing therethrough into relatively large droplets, a substantially cylindrical Teflon coated wire mesh separator element of the inside-out flow type telescoped over and spaced away from said coalescer element for permitting flow of fuel therethrough but preventing flow of said water droplets therethrough, said separator element being only approximately one-third the length of the coalescer element, a first endcap common to both of said elements for unifying said elements, said first endcap having a first seal located on the inner periphery thereof for sealing engagement with the outer wall of said tubular member, a second endcap located at the other end of said coalescer element, a second seal located at the other end of said separator element for sealing engagement with the inner wall of said housing, a bowl threadedly engaging said housing, said bowl having means formed thereon for abutting said second endcap and maintaining said first seal in engagement with the outer wall of said tubular member, and partially perforate baffle means surrounding said coalescer element, said baffle means being imperforate along that portion thereof surrounded by said separator element to prevent direct flow across said elements and thereby provide a quiescent zone therebetween.

2. A fuel filter water separator assembly comprising a head having inlet and outlet ports therein and a housing extending therefrom, a tubular member operatively connected to and extending from said head, said tubular member having the inner wall thereof communicating with said inlet port, a coalescer element of the inside-out flow type located in said housing and interposed between said inlet and outlet ports for coalescing water contained in the fuel passing therethrough into relatively large droplets, a separator element of the inside-out flow type telescoped over and spaced away from said coalescer element for permitting flow of fuel therethrough but preventing flow of said water droplets therethrough said separator element being less than one-half the length of said coalescer element, first endcap means common to both of said elements for unifying said elements, first sealing means located on the inner periphery of said first endcap means for sealing engagement with the outer wall of said tubular member, second endcap means located at the other end of said coalescer element, second sealing means located at the other end of said separator element for sealing engagement with the inner wall of said housing, a bowl operatively connected to said housing and said coalescer element for maintaining said first sealing means in engagement with the outer wall of said tubular member, and baffle means surrounding said coalescer element, said baffle means being imperforate substantially along that portion thereof surrounded by said separator element to prevent direct flow across said elements and thereby provide a quiescent zone therebetween and perforate along the remaining portion thereof.

References Cited by the Examiner

UNITED STATES PATENTS

| 3,228,527 | 1/1966 | McPherson | 210—307 |
| 3,229,817 | 1/1966 | Pall | 210—130 |

FOREIGN PATENTS 933,209   8/1963   Great Britain.

REUBEN FRIEDMAN, *Primary Examiner.*

F. SPEAR, *Assistant Examiner.*